United States Patent [19]

Koch et al.

[11] 3,899,452

[45] Aug. 12, 1975

[54] CELLULOSIC FILM HAVING INCREASED STIFFNESS

[75] Inventors: Walter T. Koch, Havertown; Edward A. Wielicki, Philadelphia, both of Pa.

[73] Assignee: FMC Corporation, Philadelphia, Pa.

[22] Filed: Oct. 8, 1971

[21] Appl. No.: 187,918

[52] U.S. Cl. ............ 260/2.5 B; 106/189; 260/17 R; 260/17.4 R

[51] Int. Cl.$^2$ .............................................. C08J 9/32

[58] Field of Search ............ 161/DIG. 5; 106/196 J; 260/2.5 B

[56] References Cited

UNITED STATES PATENTS

| | | | |
|---|---|---|---|
| 2,646,364 | 7/1963 | Porth | 106/193 J |
| 2,885,303 | 5/1959 | Kaplan | 260/2.5 B |
| 3,099,637 | 7/1963 | Neillesen | 106/193 J |
| 3,228,897 | 1/1966 | Neillesen | 106/193 J |
| 3,353,981 | 11/1967 | Jacob | 260/2.5 B |
| 3,365,358 | 1/1968 | Huchins | 260/2.5 B |
| 3,615,972 | 10/1971 | Morehouse, Jr. et al. | 260/2.5 B |

*Primary Examiner*—Morton Foelak

[57] ABSTRACT

A non-fibrous, self-supporting cellulosic film containing a small proportion of rigid hollow microspheres to increase film stiffness, and a method of preparing the film are disclosed herein.

7 Claims, No Drawings

CELLULOSIC FILM HAVING INCREASED STIFFNESS

For certain applications, for example, film used in push-feed machinery, it is desired to prepare and use regenerated cellulose films, cellulose ether films, cellulose ester films or other non-fibrous self-supporting cellulosic films, having increased stiffness. The stiffer film is also desirable for use in snack packages for display purposes and ease of stacking. Film rigidly conveys the idea of crispness in packaged goods. The stiffness of cellulosic film can be increased by decreasing the amount of plasticizer incorporated in the film or by increasing the thickness of the film. However, the lowering of the amount of plasticizer in the film generally degrades film properties, such as durability, while increasing the thickness of the film is relatively expensive.

It is an object of this invention to provide a non-fibrous cellulosic film having increased stiffness without an increase of cellulose content or a decrease in plasticizer content of the film.

It is another object of this invention to provide a regenerated cellulose film having improved stiffness and durability.

These and other objects are attained in accordance with this invention which comprises a non-fibrous, self-supporting cellulosic film having dispersed therein from about 1 up to about 25 percent, based on the weight of the cellulosic, of rigid hollow microspheres having a bulk density in the range of 0.2 to 20 pounds per cubic foot and diameters ranging from 1 to 100 microns.

The cellulosic films for this invention are regenerated cellulose films and cellulose derivative films including, for example, cellulose ester films, preferably cellulose nitrate and cellulose acetate films; cellulose ether films, preferably hydroxyethyl cellulose ether and hydroxypropyl cellulose ether films; and other cellulose derivative films well known in this art. The preferred cellulosic film are regenerate cellulose films prepared by the viscose method since these are in commercial use in the largest amount.

Film weights per square meter including the weight of the dispersed hollow microspheres are generally up to about 100 grams.

Conventional plasticizers for cellulosic films are used where necessary. Plasticizers for regenerated cellulose films, for example, glycerol and polyethylene glycols, are used in conventional amounts preferably ranging from about 15 to about 30%, based on the weight of the cellulose.

The rigid hollow microspheres useful for this invention include those prepared from a variety of materials including polycondensation resins of both the thermoplastic and thermosetting type, addition polymerization resins, and glass. The chemical nature of the rigid microspheres is not critical in order to produce stiffer films although the physical properties such as size and bulk density are critical.

The methods for preparing these rigid hollow microspheres are well known for any particular material employed. One very practical method is set forth in Belgian Pat. No. 641,711 wherein tiny microspheres are prepared by the limited coalescence polymerization technique utilizing a polymerizable monomer and a volatile blowing agent which exhibits limited solubility in the polymer. After drying, the microspheres are heated at a suitably high temperature to expand the spheres from about 2 to 5 times their original diameters.

Many suitable blowing or expanding agents are available for use in the process of forming expandable thermoplastic microspheres. Some of these are pentanes, butanes, and halohydrocarbons.

Examples of monomer and comonomer polymerizable systems from which the microspheres can be prepared include methyl methacrylate, 8 parts (wt.) methyl methacrylate and 2 parts (wt.) styrene, 9 parts methyl methacrylate and 1 part ethyl methacrylate, 7 parts methyl methacrylate and 3 parts ethyl methacrylate, 5 parts methyl methacrylate and 5 parts ethyl methacrylate, 9 parts ethyl methacrylate and 1 part methyl methacrylate, 9 parts methyl methacrylate and 1 part orthochloro styrene, orthochlorostyrene, vinylbenzyl chloride, 7 parts acrylonitrile and 3 parts vinylidene chloride, 5 parts acrylonitrile and 5 parts vinyl chloride, 9 parts methyl methacrylate and 1 part acrylonitrile, 7 parts methyl methacrylate and 3 parts of para-t-butyl styrene, 8 parts methyl methacrylate and 2 parts vinyl acetate. 9.8 parts styrene and 0.2 parts methacrylic acid; 8.3 parts styrene, 0.2 parts methacrylic acid and 15 parts vinylbenzyl chloride, 9.1 parts vinylidene chloride and 0.9 part acrylonitrile and the like. While the particular resin used is not critical, the preferred synthetic thermoplastic hollow spheres are those prepared from vinylidene chloride and acrylonitrile because of their availability and higher compatibility with cellulosics.

The term "hollow" as used herein relative to the microspheres is only meant to designate an internal area of the microspheres which is free of solid material. This area will contain a fluid, for example, air, blowing agent or other gas.

The rigid hollow microspheres which are useful for this invention, in general, have a bulk density ranging from about 0.2 to about 20 pounds, preferably 0.5 – 5.0 pounds per cubic foot and a diameter ranging from about 1 to 100 microns. It is often helpful to classify the microspheres into narrower diameter ranges within the broad given range so that they may be more advantageously employed in the manufacture of films of different thicknesses. For example, if one desires to produce a film of a thickness of about 1 mil, microspheres having diameters of less than 30 microns and averaging about 20 microns can be effectively employed to produce a film with minimal surface irregularities. On the other hand, if one wishes to produce a film having a bumpy surface, microspheres which are larger in diameter than the ordinary thickness of the film can be used.

While the microspheres can be incorporated in the cellulosic film in amounts ranging from 1 to 25%, based on the weight of the cellulosic, from about 3 to about 10% is the preferred range.

Conventional coatings for cellulosic films may be applied to the films of this invention from lacquer or latex compositions. For example, nitrocellulose coatings, vinyl coatings, olefin coatings and saran coatings are useful.

The cellulosic films having the rigid hollow microspheres dispersed therein are prepared by forming cellulosic solutions, mixing the microspheres in the solution, extruding the solution in the form of a film into a coagulating medium and recovering the film. Obviously, cellulosic solutions which could dissolve the microspheres should be avoided.

In the case of regenerated cellulose film prepared by the viscose method any film-forming viscose solution can be used. The microspheres are compatible with viscose and are readily mixed therewith by first making a "paste" of the microspheres with water and then introducing this into the viscose with stirring.

The following example is set forth to demonstrate this invention.

EXAMPLE

Expandable microspheres of vinylidene chloride-acrylonitrile copolymer resin containing a blowing agent were expanded by heating in water at 85°C. The microspheres were filtered off and dried at room temperature. The expanded microspheres had a bulk density of about 1 pound per cubic foot and diameters ranging from about 6 to about 66 microns and an average diameter of about 33 microns.

The microspheres were mixed with water to obtain a paste and the paste was added to a conventional film-forming viscose solution. Films of the viscose were then cast, coagulated and regenerated in an aqueous acid bath in the usual manner. The wet film was plasticized by passing it through an aqueous bath containing 6–8 wt. % polyethylene glycol (avg. molecular weight of 400) and then dried.

Film stiffness was measured on the Thwing Albert Handle-O-Meter, a measuring device used in the textile and paper industries for this purpose. The slot width of the Handle-O-Meter was 5 millimeters and the sample size was 4 inches by 4 inches. Each sample was conditioned at 75°F. and 45% relative humidity. The results were expressed at "total hand" which was the sum of the four readings taken on both sides and in both directions of the samples. The higher the result, the stiffer the film sample.

Durability of the film samples was measured by forming bags of the film and inserting a specified weight of lead shot into the bag. The bag was closed and placed in a jar containing a baffle. The jar was closed and placed on its side between a set of revolving mill rolls. The bag in the jar was repeatedly lifted by the baffle and dropped as the jar rotated. The durability was measured as the time period (in seconds) from the start of rotation of the jar to the time of rupture of the bag. The closed jar permitted testing of the film samples at controlled moisture content and temperature.

The following table shows the relationship between microsphere content of the film, cellulose gram weight of the film, film stiffness and film durability for regenerated cellulose (viscose) films cast from the same size film extrusion die.

Table

| Microsphere Content, g./100 g. of cellulose | Cellulose gram wt.,g/m.² | Total Hand not normalized | Durability,sec. 45% R.H.,O°C. |
|---|---|---|---|
| 0 | 13.5 | 8.7 | 80 |
| 4.3 | 11.8 | 14.9 | — |
| 8.2 | 11.1 | 18.3 | 104 |
| 9.4 | 10.2 | 21.5 | 107 |

It is seen from the above table that the stiffness characteristics of the film increase distinctly as the amount of rigid microspheres in the film is increased. This is accomplished without increasing the cellulose content of the film or decreasing its plasticizer content. In addition, durability of the cellulose film is also increased.

Various changes and modifications may be made in practicing the invention without departing from the spirit and scope thereof and, therefore, the invention is not to be limited except as defined in the appended claims.

We claim:

1. A non-fibrous, self-supporting cellulosic film having dispersed therein from about one up to about 25 percent, based on the weight of the cellulosic, of rigid hollow microspheres having a bulk density in the range of 0.2 to 20 pounds per cubic foot and diameters ranging from one and 100 microns.

2. The film of claim 1 wherein the amount of microspheres present in the film ranges from about 3 to about 10 percent, based on the weight of the cellulosic and the bulk density of the microspheres ranges from 0.5 to 5 pounds per cubic foot.

3. The film of claim 1 wherein the cellulosic is regenerated cellulose.

4. The film of claim 1 wherein the cellulosic is a cellulose ether.

5. The film of claim 1 wherein the cellulosic is a cellulose ester.

6. The film of claim 1 wherein the rigid microspheres are produced from a vinylidene chloride-acrylonitrile copolymer.

7. The film of claim 1 wherein the cellulosic is regenerated cellulose, the rigid microspheres are produced from vinylidene chloride-acrylonitrile copolymer, the microspheres are present in an amount ranging from about 3 to about 10 percent, based on the weight of the cellulose, and the bulk density of the microspheres ranges from 0.5 to 5.0 pounds per cubic foot.

* * * * *

UNITED STATES PATENT OFFICE
CERTIFICATE OF CORRECTION

PATENT NO. : 3,899,452

DATED : August 12, 1975

INVENTOR(S) : Walter T. Koch and Edward A. Wielicki

It is certified that error appears in the above-identified patent and that said Letters Patent are hereby corrected as shown below:

Column 2, line 19, "vinyl" should read --vinylidene--.

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*